United States Patent
Hess et al.

(10) Patent No.: US 9,269,376 B1
(45) Date of Patent: Feb. 23, 2016

(54) EFFICIENT BURST DATA VERIFY IN SHINGLED DATA STORAGE DRIVES

(71) Applicant: HGST Netherlands B.V., Amsterdam (NL)

(72) Inventors: Randall L. Hess, Colorado Springs, CO (US); Berck E. Nash, Divide, CO (US); James M. Reiser, Colorado Springs, CO (US); Randy L. Roberson, Lutz, FL (US); Kris B. Stokes, Colorado Springs, CO (US); Jesse L. Yandell, Colorado Springs, CO (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/788,771

(22) Filed: Jun. 30, 2015

(51) Int. Cl.
  *G11B 27/36* (2006.01)
  *G11B 5/09* (2006.01)
  *G11B 5/012* (2006.01)

(52) U.S. Cl.
  CPC .................................... *G11B 5/012* (2013.01)

(58) Field of Classification Search
  CPC .... G11B 27/36; G11B 5/012; G11B 2220/90; G11B 2220/20; G11B 5/0008; G11B 27/3027; G11B 5/584
  USPC ............................... 360/31, 76, 77.06, 53, 48
  See application file for complete search history.

(56) References Cited

U.S. PATENT DOCUMENTS

| | | | |
|---|---|---|---|
| 5,872,800 A | 2/1999 | Glover et al. | |
| 7,120,737 B1 | 10/2006 | Thelin | |
| 7,774,540 B2 | 8/2010 | Han et al. | |
| 8,140,909 B2 | 3/2012 | Luan et al. | |
| 8,327,220 B2 | 12/2012 | Borchers et al. | |
| 8,612,798 B1 | 12/2013 | Tsai | |
| 8,665,545 B2 | 3/2014 | Coker et al. | |
| 8,780,487 B2 * | 7/2014 | Park ....................... | G11B 5/012 360/31 |

OTHER PUBLICATIONS

Riska et al. "Idle Read After Write—IRAW". 2008 USENIX Annual USENIX Association Technical Conference.

* cited by examiner

*Primary Examiner* — Nabil Hindi
(74) *Attorney, Agent, or Firm* — Setter Roche LLP (57) ABSTRACT

To provide enhanced operation of data storage devices and systems, various systems, apparatuses, methods, and software are provided herein. In a first example, a data storage device is presented with storage media comprising a cache storage region and a shingled magnetic recording (SMR) storage region that is divided into burst zones. A storage control system receives write operations and accumulates write data in the cache storage region until a commit threshold condition. Responsively, the storage control system transfers the write data into a burst zone of the SMR storage region, and verifies the write data written into the burst zone once the burst transfer is complete. Responsive to data verify errors in the write data written into the burst zone, the storage control system writes data associated with the data verify errors into an exception location associated with the burst zone.

20 Claims, 4 Drawing Sheets

EFFICIENT BURST DATA VERIFY IN SHINGLED DATA STORAGE DRIVES

TECHNICAL FIELD

Aspects of the disclosure are related to the field of data storage and hard disk drive arrays in data storage systems.

TECHNICAL BACKGROUND

Computer and network systems such as personal computers, workstations, server systems, and cloud storage systems, typically include data storage elements for storing and retrieving data. These data storage elements can include data storage devices, such as hard disk drives, solid state storage devices, hybrid storage devices, tape storage devices, and other mass storage devices.

Magnetic storage drives, such as hard disk drives, can employ various magnetic storage technologies. One such storage technology includes data storage drives with shingled magnetic recording (SMR) technology to increase storage densities on associated storage media. SMR technology physically overlaps adjacent data tracks on a magnetic storage media, in contrast to a non-overlapping recording technology, such as parallel magnetic recording (PMR) or other non-overlapping recording techniques.

As computer systems and networks grow in numbers and capability, there is a need for more and more storage capacity. Cloud computing and large-scale data processing systems have further increased the need for digital data storage systems capable of transferring and holding immense amounts of data. Data centers can include a large quantity of data storage devices in various rack-mounted and high-density storage configurations. However, when data storage devices that employ SMR techniques attempt to service many random storage operations in short periods of time, such as writes, slowdowns can occur due in part to verification processes for the data.

OVERVIEW

To provide enhanced operation of data storage devices and systems, various systems, apparatuses, methods, and software are provided herein. In a first example, a data storage device is presented with storage media comprising a cache storage region and a shingled magnetic recording (SMR) storage region that is divided into burst zones. A storage control system receives write operations and accumulates write data in the cache storage region until a commit threshold condition. Responsively, the storage control system transfers the write data into a burst zone of the SMR storage region, and verifies the write data written into the burst zone once the burst transfer is complete. Responsive to data verify errors in the write data written into the burst zone, the storage control system writes data associated with the data verify errors into an exception location associated with the burst zone.

In another example, a method of operating a data storage device is presented. The method includes storing write data responsive to write operations on a storage media comprising a cache storage region and an SMR storage region that is divided into a plurality of burst zones. The method also includes accumulating the write data in the cache storage region until a commit threshold condition. Responsive to the commit threshold condition, the method includes burst transferring the write data into at least a first burst zone of the SMR storage region. The method also includes verifying the write data written into the first burst zone once the burst transferring is complete for the write data into the first burst zone. Responsive to data verify errors in the write data written into the first burst zone, the method includes writing data associated with the data verify errors into an exception location associated with the first burst zone.

In another example, a data storage assembly is presented. The data storage assembly includes a plurality of hard disk drives (HDD), each comprising storage media with a cache storage region and an SMR storage region that is divided into a plurality of burst zones. The data storage assembly includes a storage control system configured to receive write operations over a host interface for storage of write data by the data storage assembly and accumulate the write data in a cache storage region of at least a first HDD until a commit threshold condition. Responsive to the commit threshold condition, the storage control system is configured to burst transfer the write data into at least a first burst zone of an SMR storage region of at least the first HDD. The storage control system is configured to verify the write data written into the first burst zone once the storage control system completes the burst transfer of the write data into the first burst zone. Responsive to data verify errors in the write data written into the first burst zone, the storage control system is configured to write data associated with the data verify errors into an exception location associated with the first burst zone.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

High-density magnetic storage devices employ a variety of storage technologies. One such storage technology includes rotating data storage drives with shingled magnetic recording (SMR) technology. SMR technology allows for read/write heads to physically overlap adjacent data tracks on the storage media, in contrast to a non-overlapping recording technology, such as parallel magnetic recording (PMR) or a non-overlapping version of SMR, among others. Since SMR technology has closely-spaced and overlapping data tracks on the storage media, sequential or burst write operations are preferred instead of random write operations.

This sequential or burst write operation can mitigate unwanted corruption of already-written data on adjacent tracks of the data storage drive. To assist in performing sequential or burst write operations, a caching mechanism can be employed to first accumulate a threshold amount of write operations before a burst write of data to the associated SMR portions of the data storage drives. However, when many write operations are cached before committing associated write data into an SMR region, verification of the data during transfer into the SMR region can be troublesome. If the SMR regions are written in bursts of data, any write verification can lead to interruption of the burst write operations. Furthermore, if data written during a burst write operation fails data verification, re-writing of that data can be difficult due to the high density and overlapping tracks of SMR recording techniques. The examples herein describe a verification process performed upon completion of a burst write operation, while a specially designated exception zone is maintained for re-writes of data that fails verification.

Figure 1:
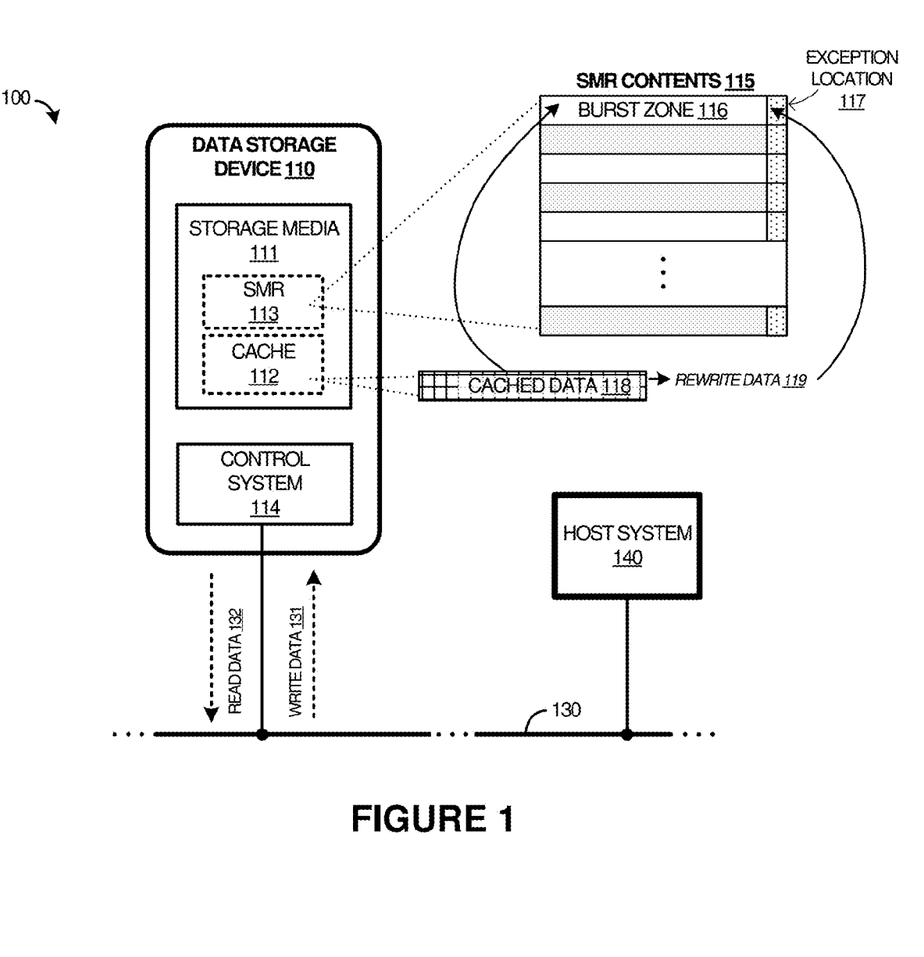
FIG. 1 is a system diagram illustrating a data system.

In a first example of a data storage system, FIG. 1 is presented. FIG. 1 is a system diagram illustrating data system 100. System 100 includes data storage device 110 and host system 140. Data storage device 110 and host system 140 communicate over storage link 130. Data storage device 110 can be included in an assembly that includes one or more data storage devices and one or more control systems. In FIG. 1, data storage device 110 includes control system 114 and storage media 111. Control system 114 is communicatively coupled to storage media 111. Although control system 114 is shown as internal to data storage device 110 in this example, it should be understood that in other examples control system 114 can be included in other elements external to data storage device 110. In some examples, data storage device 110 comprises a hard disk drive (HDD).

In operation, data storage device 110 receives read or write transactions over storage link 130 issued by host system 140. Responsive to read transactions, data storage device 110 can retrieve data stored upon storage media 111 for transfer to host system 140. Responsive to write transactions, data storage device 110 stores data on storage media 111. It should be understood that other components of data storage device 110 are omitted for clarity in FIG. 1, such as transaction queues, chassis, enclosures, fans, interconnect, read/write heads, armatures, preamps, transceivers, processors, amplifiers, motors, servos, enclosures, and other electrical and mechanical elements.

Figure 2:
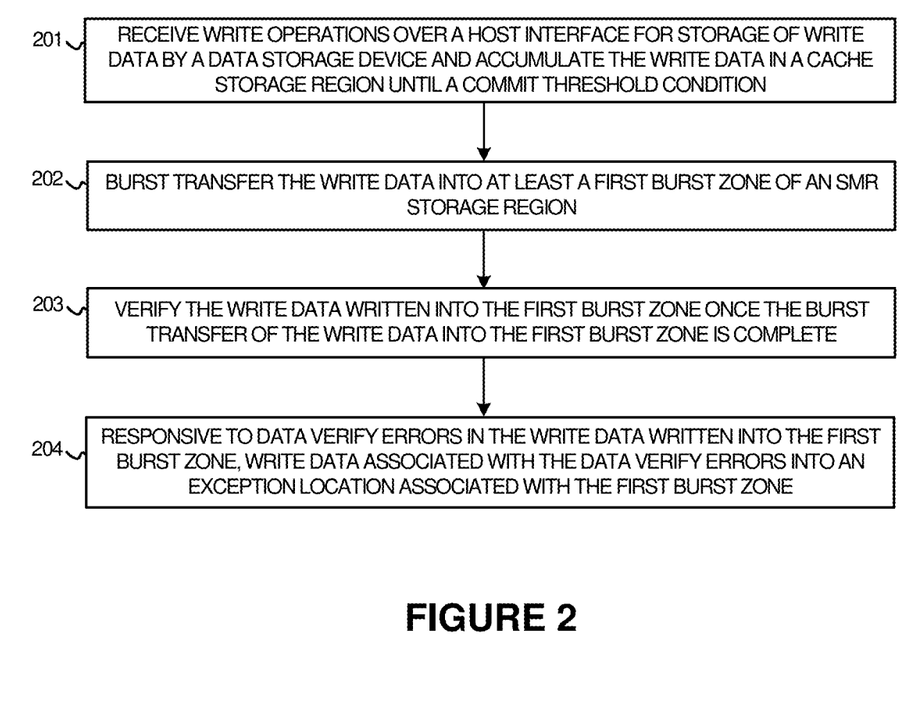
FIG. 2 is a flow diagram illustrating a method of operation of a data storage system.

To further illustrate the operation of data system 100, FIG. 2 is provided. FIG. 2 is a flow diagram illustrating a method of operating data storage device 110. The operations of FIG. 2 are referenced below parenthetically. In FIG. 2, data storage device 110 stores data on storage media 111 that comprises cache storage region 112 and SMR storage region 113. Cache storage region 112 comprises at least one non-SMR storage region, such as PMR storage regions or other non-SMR storage regions, which is on the same rotating storage media as SMR storage region 113. Some examples of the storage media comprise overlapping track SMR recording for SMR storage region 113 and a non-overlapping track SMR recording for cache storage region 112. The non-overlapping type of SMR storage regions can comprise a random read-write region, which uses a widely-spaced SMR technique so that random read/writes are possible and adjacent tracks do not overlap as in SMR techniques. In some examples, cache storage region 112 is included in other storage media, such as solid state storage media. It should be understood that more than one SMR storage region or cache storage region can be employed to store data, such as in mirroring, striping, or other redundancy techniques.

Data is stored responsive to various storage operations, such as write operations received by data storage array over storage link 130. Data storage device 110 receives storage operations transferred by host system 140 that comprise write operations for storage of write data on storage media 111 and read operations for retrieval of data already stored on storage media 111. In this example, the storage operations are received by control system 114 over storage link 130, and can be received into a transaction queue or input/output operations (IOs) queue for handling by control system 114.

In a specific example, storage control system 114 of data storage device 110 receives (201) write operations over at host interface associated with storage link 130 for storage of write data by data storage device 110, and accumulates the write data in cache storage region 112 until a commit threshold condition. The write operations are typically directed to various write locations on storage media 111, such as write locations associated with SMR storage region 113. The write locations can comprise an address, logical block address, physical block address, or other location identifier that describes a location on storage media to which the write data is to be written, which can also include logical unit (LUN) designations, network addresses, or partition identifiers.

Instead of directly writing the write data into SMR storage region 113, storage control system 114 accumulates the write data in cache storage region 112 until a commit threshold condition. As shown in FIG. 1, write data 131 is received over storage link 130 and accumulated into cache 112 as cached data 118. Cache storage region 112 is included in storage media 111 in this example, and control system 114 continues to receive write data associated with write operations until a commit threshold is reached.

The commit threshold can comprise data storage device 110 receiving a threshold amount of write data, such as a predetermined number of data blocks held in cache storage region 112. The commit threshold can comprise a predetermined portion of cache storage region 112 filling with data past a threshold level. The commit threshold can be a time threshold, where after a predetermined amount of time any cached data will be committed. Other commit thresholds can be established, including combinations thereof. When enough data has been cached into cache storage region 112 or after another threshold (such as a timing threshold), then any data held in cache storage area 112 can be burst written into SMR storage region 113.

Control system 114 burst transfers (202) the write data into at least a first burst zone of SMR storage region 113. FIG. 1 shows burst zone 116 as an example of a first burst zone, with additional burst zones indicated below burst zone 116 in SMR contents 115. The burst zone can comprise a plurality of tracks of storage media 111 which are in SMR storage region 113. Several burst zones can be established for a particular SMR storage region, which can be established based on a size of the associated SMR storage region as compared to a data block size of the commit threshold. The burst zone sizing can be dynamic, and based on an amount of data accumulated in cache storage region 112. In some examples, a sub-track quantity of storage space can be employed for a burst zone, such as when time thresholds are employed commit thresholds.

Control system 114 does not purge or remove write data from cache storage region 112 until the data has been successfully verified as written in SMR storage region 113. Specifically, control system 114 verifies (203) the write data written into the first burst zone once the burst transfer of the write data into the first burst zone is complete. In FIG. 1, cached data 118 is committed into burst zone 116. Once cache data 118 is committed, then control system 114 verifies the data in burst zone 116. This verification process includes reading the data written into burst zone 116 and performing one or more data integrity checks on the data. In some examples, control system 114 performs this verification by reading the data written into burst zone 116 and verifying. In other examples, a separate verification process is instructed to occur by control system 114, such as when individual data storage drives are included which can perform verification processes responsive to instructions of control system 114. These data storage drives can report any errors or data integrity problems to control system 114. These data integrity checks include cyclic redundancy checks (CRC), error correcting code checks (ECC), checksum verification, single-error correction and double-error detection (SECDED) Hamming code processes, among other data integrity checks, including combinations and variations thereof.

Responsive to data verify errors in the write data written into the first burst zone, control system 114 writes (204) data associated with the data verify errors into an exception location associated with the first burst zone. In FIG. 1, exception location 117 is associated with burst zone 116. In some examples, exception location 117 is arranged at an end of burst zone 116 on storage media 111, such as at the beginning or the end of a set of tracks of SMR storage region 113. If any errors in data read from burst zone 116 are identified, such as data errors, block errors, or other data verification errors, then the data associated with those errors is re-written to SMR storage region 113. However, this re-write data is written into exception location 117 instead overwriting the data already written into burst zone 116.

Control system 114 can mark the storage locations associated with the data that fails verification as unused or free, and re-write the data into exception location 117. Thus, the portions of data that fail verification in burst zone 116 is not used for further reads and instead the portions of the data are written into exception location 117 and used for reads. Data is verified once written into exception location 117 and thus may require further re-writes into exception location 117 if found to fail verification a subsequent time or times. If enough data fails verification of writing into burst zone 116 or upon subsequent verification in exception location 117, then further exception locations can be established. However, one or more of the tracks associated with burst zone 116 might be considered unusable if too many errors are detected, and a new burst zone can instead be employed with burst zone 116 being marked as bad by control system 114.

Advantageously, in the examples herein, data storage devices can increase performance by eliminating verification of data after a single track is written in a burst of multiple tracks of data. For example, with a track size of 2 megabytes (MB), and a 256 MB burst zone, at least 127 separate verification processes would need to occur to verify each track. In the examples herein, native drive verification after every track is disabled and instead far fewer burst verification process can be performed for a burst zone comprising multiple tracks, as described herein. Cache storage region 112 can accumulate write data until a write burst comprising write data of many write operations is performed to commit cached data into SMR storage region 113. Data verification is performed after the burst of multiple tracks of data into SMR storage region 113, which can speed up the commit process by eliminating verification after every track is written. Once data has been committed into SMR storage region 113, read operations directed to that data can be serviced from SMR storage region 113, such as read operations 132. Specifically, if data is committed into burst zone 116, then portions of the data can be provided from either burst zone 116 or from exception location 117, depending upon where the portions of the data were successfully written and verified or re-written. Enhanced operation of data storage devices is also achieved by locating the exception locations proximate to associated burst zones on storage media, to locate re-write data within a physical locality to an associated burst zone on the storage media, reducing long seek delays when reading data from the burst zone and associated re-write data.

Returning to the elements of FIG. 1, data storage device 110 includes one or more computer readable storage media 111 accessible via one or more read/write heads and associated electromechanical elements. Data storage device 110 also includes processing circuitry, communication interfaces, armatures, preamps, transceivers, processors, amplifiers, motors, servos, enclosures, and other electrical and mechanical elements. Data storage device 110 can also comprise cache systems, chassis, enclosures, fans, interconnect, cabling, or other circuitry and equipment.

Data storage device 110 can comprise a hard disk drive, hybrid disk drive, or other computer readable storage device. Data storage device 110 can include further elements, such as those discussed for hard disk drives 320-323 in FIG. 3, although variations are possible. The computer readable storage media of data storage device 110 can include rotating magnetic storage media, but can additionally include other media, such as solid state queues or cache systems of data storage device 110. These other media can include solid state storage media, optical storage media, non-rotating magnetic media, phase change magnetic media, spin-based storage media, or other storage media, including combinations, variations, and improvements thereof. In some examples, data storage device 110 comprises a hybrid hard drive employing solid state storage elements in addition to rotating magnetic storage media. Storage media 111 can employ various magnetic storage schemes, such as shingled magnetic recording (SMR), non-shingled magnetic recording, perpendicular magnetic recording (PMR), including combinations, variations, and improvements thereof.

Storage control system 114 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Host system 140 can include processing elements, data transfer elements, and user interface elements. In some examples host system 140 is a central processing unit of a computing device or computing system. In other examples, host system 140 also includes memory elements, data storage and transfer elements, controller elements, logic elements, firmware, execution elements, and other processing system components. In yet other examples, host system 140 comprises a RAID controller processor or storage system central processor, such as a microprocessor, microcontroller, Field Programmable Gate Array (FPGA), or other processing and logic device, including combinations thereof. Host system 140 can include, or interface with, user interface elements which can allow a user of data storage system 100 to control the operations of data storage system 100 or to monitor the status or operations of data storage system 100. These user interface elements can include graphical or text displays, indicator lights, network interfaces, web interfaces, software interfaces, user input devices, or other user interface elements. Host system 140 can also include interface circuitry and elements for handling communications over storage link 130, such as logic, processing portions, buffers, transceivers, and the like.

Storage link 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one bus 130 is shown in FIG. 1, it should be understood that one or more discrete links can be employed between the elements of data storage system 100.

Figure 3:
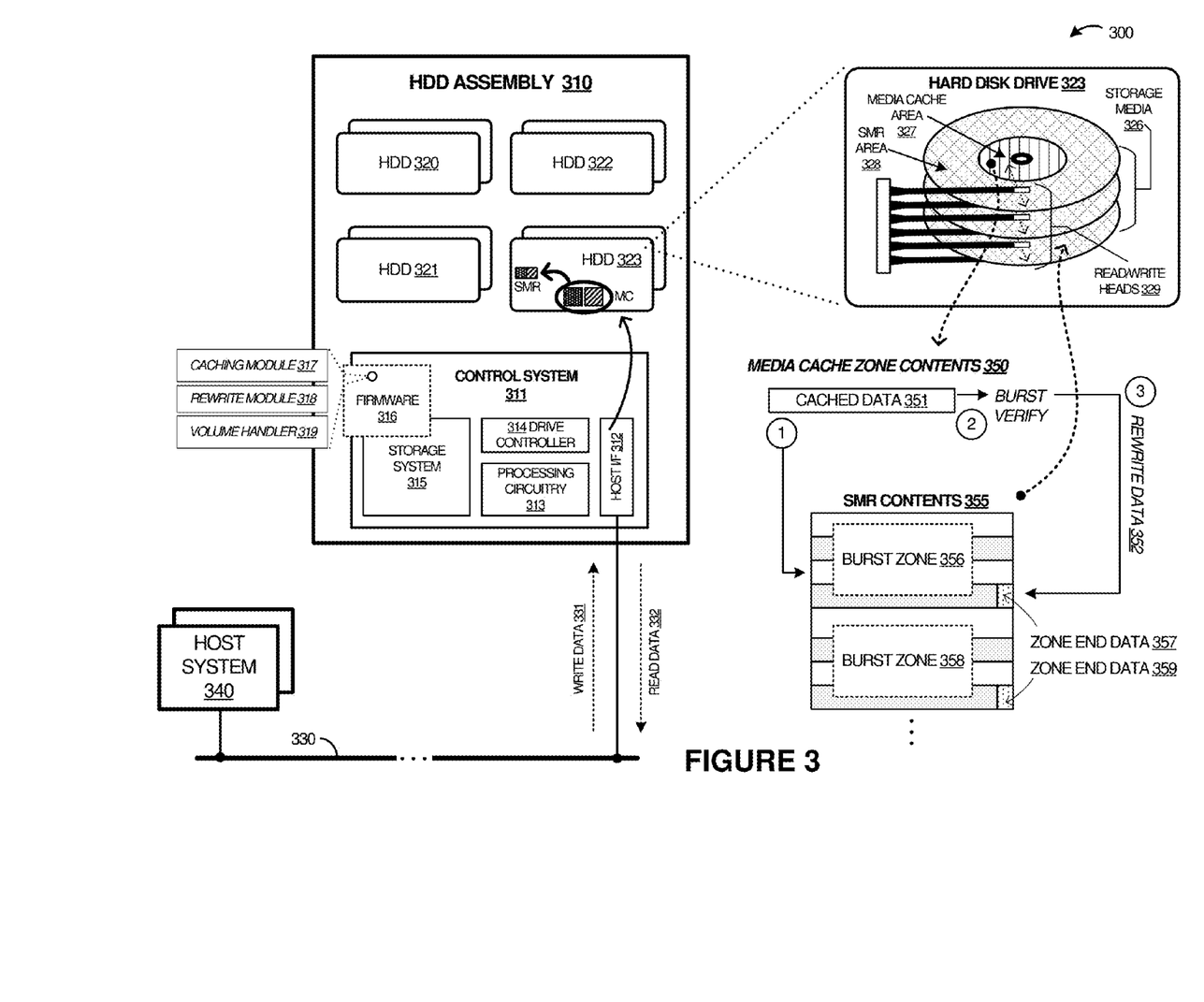
FIG. 3 is a system diagram illustrating a data system.

As a further example data storage system employing a data storage array, FIG. 3 is presented. FIG. 3 is a system diagram illustrating data storage system 300. Data storage system 300 includes hard disk drive (HDD) assembly 310 and one or more host systems 340. HDD assembly 310 and host system 340 communicate over storage link 330. Various elements of HDD assembly 310 can be included in data storage device 110 of FIG. 1, although variations are possible. Although one HDD assembly 310 is shown in FIG. 3, it should be understood that more than one HDD assembly could be included and linked to host system 340 or other host systems, such as in a data storage environment employing many hard disk drives in an array.

HDD assembly 310 can comprise a storage assembly with associated enclosure and structural elements which is insertable into a rack that can hold other HDD assemblies, such a rackmount server environment. The enclosure can include structural elements to mount the plurality of HDDs and can also include at least one external connector for communicatively coupling control system 311 or host interface 312 of HDD assembly 310 over storage link 330.

HDD assembly 310 can comprise a redundant array of independent disks (RAID) array, or a JBOD device ("Just a Bunch Of Disks") device which include a plurality of independent disks which can be spanned and presented as one or more logical drives to host system 340. In some examples, HDD assembly 310 comprises a virtual box of disks (VBOD). A VBOD employs SMR hard disk drives in an array. However, SMR disks typically have inefficiencies for random writes due to the shingled nature of adjacent tracks for data. The VBOD abstracts the SMR drives and allows random writes and random reads while still having underlying SMR media which ultimately hold the associated data. In the examples herein, although SMR drives are employed, write data is first cached in one or more other non-SMR regions prior to archival in the associated SMR regions.

Storage link 330 can include one or more links, although a single link is shown in FIG. 3. Storage link 330 can comprise a storage or disk interface, such as Serial Attached ATA (SATA), Serial Attached SCSI (SAS), FibreChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof.

Host system 340 can include one or more computing and network systems, such as personal computers, servers, cloud storage systems, packet networks, management systems, or other computer and network systems, including combinations and variations thereof. In operation, host system 340 issues read and write commands or operations to HDD assembly 310 over storage link 330, among other commands or operations which can include control instructions, metadata retrieval operations, configuration instructions, and the like. Likewise, HDD assembly 310 can transfer read data over storage link 330, among other information such as graphical user interface information, status information, operational information, failure notifications, alerts, and the like.

HDD assembly 310 includes a plurality of hard disk drives (HDDs), namely HDD 320-323, although any number of HDDs can be included. Each HDD 320-323 comprises a hard disk drive, hybrid disk drive, or other computer readable storage device. Each HDD 320-323 is coupled to control system 311 by one or more links, which in this example comprises Serial Attached SCSI (SAS) links, although other link types can be employed. Each HDD 320-323 can comprise similar elements, and for exemplary purposes, a detailed view of only HDD 323 is shown in FIG. 3, although variations are possible among HDD 320-323. HDD 323 includes storage media 326, R/W heads 329. HDD 323 can include further elements, such as armatures, preamps, transceivers, processors, amplifiers, motors, servos, enclosures, and other electrical and mechanical elements. In FIG. 3, HDD 323 also subdivides storage media 326 into at least two zones, namely media cache area 327 and SMR area 328.

HDD assembly 310 also includes control system 311. Control system 311 includes processing circuitry 313, drive controller 314, storage system 315, and host interface (I/F) 312. Furthermore, control system 311 includes firmware 316 which includes caching module 317, rewrite module 318, and volume handler 319 which, when executed by at least processing circuitry 313, operates as described below.

Control system 311 handles storage operations for HDD assembly 310, such as receiving storage operations from host systems over storage link 330 in host interface 312. Write data 331 can be received in one or more write operations, and read data 332 can be provided to hosts responsive to one or more read operations. An interface can be provided to a host system, such as a single (or redundant) Ethernet port, which allows for the host system to access the storage capacity of HDD assembly. Control system 311 can establish any number of logical volumes or logical storage units across the various HDDs in HDD assembly 310, which can comprise spanning, redundant arrays, striping, or other data storage techniques.

Host interface 312 includes one or more storage interfaces for communicating with host systems, networks, and the like over at least link 330. Host interface 312 can comprise transceivers, interface circuitry, connectors, buffers, microcontrollers, and other interface equipment. Host interface 312 can also include one or more I/O queues which receive storage operations over link 330 and buffers these storage operations for handling by processing circuitry 313.

Control system 311 also includes processing circuitry 313, drive controller 314, and storage system 315. Processing circuitry 313 can comprise one or more microprocessors and other circuitry that retrieves and executes firmware 316 from storage system 315. Processing circuitry 313 can be implemented within a single processing device but can also be distributed across multiple processing devices or sub-systems that cooperate in executing program instructions. Examples of processing circuitry 313 include general purpose central processing units, application specific processors, and logic devices, as well as any other type of processing device, combinations, or variations thereof. In some examples, processing circuitry 313 includes a system-on-a-chip device or microprocessor device, such as an Intel Atom processor, MIPS microprocessor, and the like.

Drive controller 314 can include one or more drive control circuits and processors which can control various data redundancy handling among the various HDDs of HDD assembly 310. Drive controller 314 also includes HDD interfaces, such as SAS interfaces to couple to the various HDDs in HDD assembly 310. In some examples, drive controller 314 and processing circuitry 313 communicate over a peripheral component interconnect express (PCIe) interface or other communication interfaces. In some examples, drive controller 314 comprises a RAID controller, RAID processor, or other RAID circuitry.

Storage system 315 can comprise any non-transitory computer readable storage media readable by processing circuitry 313 or drive controller 314 and capable of storing firmware 316. Storage system 315 can include volatile and nonvolatile, removable and non-removable media implemented in any method or technology for storage of information, such as computer readable instructions, data structures, program modules, or other data. In addition to storage media, in some implementations storage system 315 can also include communication media over which firmware 316 can be communicated. Storage system 315 can be implemented as a single storage device but can also be implemented across multiple storage devices or sub-systems co-located or distributed relative to each other. Storage system 315 can comprise additional elements, such as a controller, capable of communicating with processing circuitry 313. Examples of storage media of storage system 315 include random access memory, read only memory, magnetic disks, optical disks, flash memory, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 316, caching module 317, rewrite module 318, and volume handler 319 can be implemented in program instructions and among other functions can, when executed by control system 311 in general or processing circuitry 313 in particular, direct control system 311 or processing circuitry 313 to operate as described herein. Firmware 316 can include additional processes, programs, or components, such as operating system software, database software, or application software. Firmware 316, caching module 317, rewrite module 318, and volume handler 319 can also comprise software or some other form of machine-readable processing instructions executable by processing circuitry 313. In at least one implementation, the program instructions can include first program instructions that direct control system 311 to receive write operations and responsively store write data in a cache storage region prior to transferring into a SMR storage region (caching module 317), burst write cached data into SMR areas and verify the data after the burst write, perform rewrites of data to predetermined burst end zones when data fails verification (rewrite module 318), determine logical arrangements of the various HDDs for addressing and redundancy of cached data and archival of committed data (volume handler 319), and provide read data retrieved from any of the HDDs to the host system, among other operations.

In general, firmware 316 can, when loaded into processing circuitry 313 and executed, transform processing circuitry 313 overall from a general-purpose computing system into a special-purpose computing system customized to operate as described herein. Encoding firmware 316 on storage system 315 can transform the physical structure of storage system 315. The specific transformation of the physical structure can depend on various factors in different implementations of this description. Examples of such factors can include, but are not limited to the technology used to implement the storage media of storage system 315 and whether the computer-storage media are characterized as primary or secondary storage. For example, if the computer-storage media are implemented as semiconductor-based memory, firmware 316 can transform the physical state of the semiconductor memory when the program is encoded therein. For example, firmware 316 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 4:
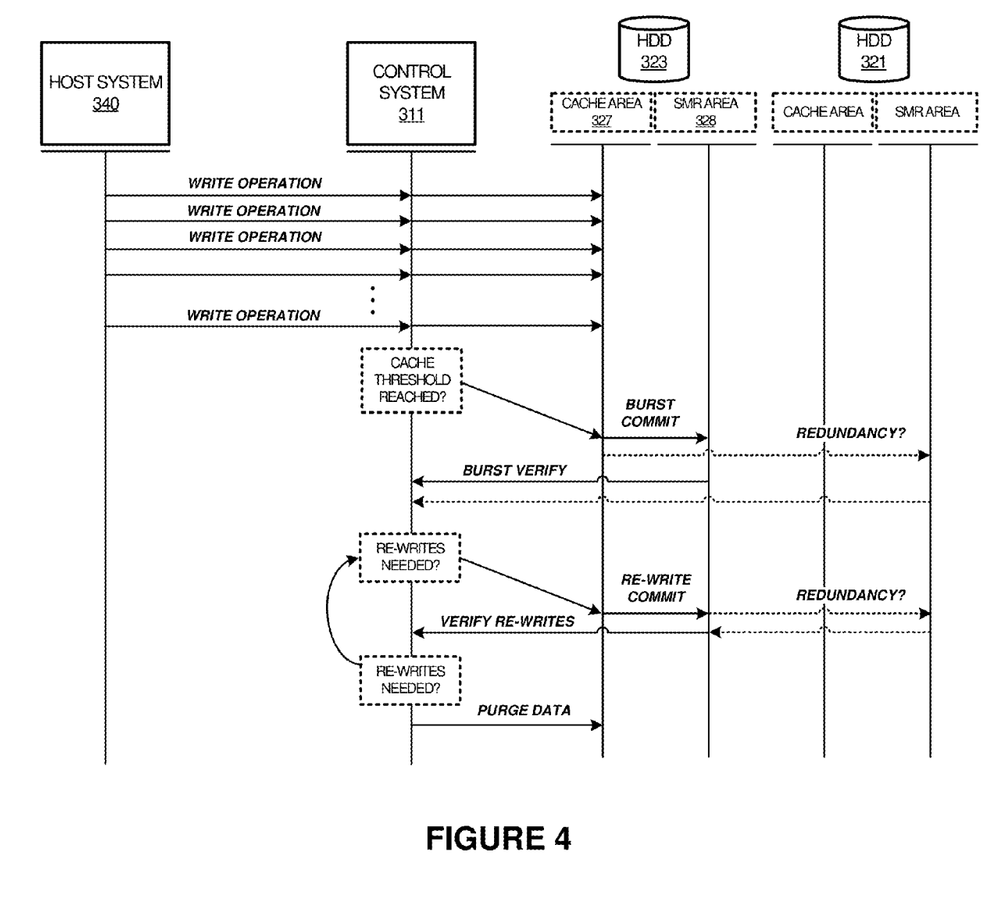
FIG. 4 is a flow diagram illustrating a method of operation of a data storage system.

To further illustrate the operation of system 300 and HDD assembly 310, FIG. 4 is presented. FIG. 4 is a sequence diagram illustrating a method of operation of HDD assembly 310. In FIG. 4, HDD assembly 310 receives write data for storage by HDD assembly 310. This write data is associated with one or more write operations which are received over link 330 from host system 340, such as write data 331 in FIG. 3. Write data can comprise one or more data blocks for storage by HDD assembly 310 which is directed for storage at a designated storage address or storage location. HDD assembly 310 stores write data for later retrieval by host 340 on associated HDDs. However, in this example, upon receipt of write data, HDD assembly 310 caches write data in a cache zone of at least one HDD prior to committing write data into an SMR region of at least one HDD. Additionally, each SMR region is subdivided into one or more burst zones which can handle bursts of write data. These burst zones are accompanied by zone end data (ZED) regions which contain data that fails verification and is re-written.

A particular HDD or set of HDDs can be designated to handle data for a particular logical storage unit (LUN) or storage partition. Write operations can be directed to any of the logical partitions, and indicate a storage address, logical unit, partition, or other indication which designates logical blocks that in HDD assembly 310 that write data associated with a write operation is directed. However, before the write data is stored in the location designated by the write operation, the write data is cached in a cache area of an associated HDD.

In FIG. 4, a predetermined quantity of write data is accumulated into a cache area before commit of that data into an associated SMR area. One or more write operations can be received by HDD assembly 310, such as shown in FIG. 4. Control system 311 can cache write data for these write operations into a predetermined cache area associated with one or more HDDs, depending upon a selected redundancy scheme such as mirroring.

In a specific example, control system 311 receives a plurality of write operations for storage of data in HDD 323. Control system 311 caches write data associated with these write operations in cache area 327 of HDD 323 until a cache commit event is reached. The cache commit event can comprise HDD assembly 310 receiving a threshold amount of write data, such as a predetermined number of data blocks held in cache area 327. The cache commit event can comprise an associated cache zone filling with data past a threshold level.

In this example, the cache commit event is determined based on a size of a burst zone into which the write data is to be committed. Control system 311 establishes and maintains several burst zones within each SMR area of a HDD. SMR contents 355 shows an example of these burst zones for SMR area 328, although variations are possible. SMR contents 355 includes more than one burst zone 356 and 358. Each burst zone spans more than one track on storage media 326, and includes a zone end data (ZED) area. Specifically, burst zone 356 includes ZED 357 while burst zone 358 includes ZED 359. Each ZED is included at the end of a burst zone, and includes a predetermined amount of space reserved for data re-writes when bursting data into the associated burst zone.

When enough data has been cached into cache area 327 to fill a burst zone (or after another threshold such as a timing threshold), then any data held in cache area 327 can be burst written into a burst zone of SMR area 328. In FIG. 4, control system 311 identifies when enough data has been accumulated into cache area 327 to perform a burst of that data into burst zone 356 of SMR area 328. Control system 311 then performs a burst write of the data held in cache area 327 into SMR area 328. This burst write can include a continuous transfer of data from cache area 327 into burst zone 356 using one or more write operations to the tracks that comprise burst zone 356.

To prevent HDD 323 from verifying data after every write operation, track, or other granular measure instead of in bursts, a native or built-in verification feature of HDD 323 can be disabled or inactivated. This verification feature can then be initiated and controlled by control system 311 to enact a verification after a burst of data has been completed to multiple tracks of a burst zone of HDD 323.

In addition to committing the write data in cache area 327 of HDD 323 into burst zone 356 of HDD 323, a redundant commit process can occur. This redundant commit process can commit mirrored copies of the write data held in cache area 327 into more than one HDD or more than one burst zone. FIG. 4 shows one possible example of this redundant operation. Furthermore, each burst zone can be logically abstracted from a single HDD and instead comprise a mirrored space across more than on HDD.

Individual write operations typically are employed for transfer of data by host system 340 for storage by HDD assembly 310. These write operations have associated write data that is accumulated into cache area 327 by control system 311. Instead of performing a verify process for each individual track of data when the data is transferred from cache area 327 into burst zone 356, a burst verification process is performed. This burst verification process includes control system 311 preventing verify operation of HDD 323 after each track of data and issuing verify instructions to HDD 323 to verify the data from a particular burst zone after control system 311 commits bursting of that data into the particular burst zone. HDD 323 can report any errors or data integrity problems to control system 311. In other examples, control system 311 performs this verification by reading the data written into the particular burst zone and verifying. The data is verified after reading using an associated verification check, which can include an ECC check, checksum check, parity check, CRC check, or other data verification checks. In examples where redundant burst zones are employed, then data can be verified for both burst zones after completion of the burst write process for the associated burst zone.

If any of the data read from burst zone 356 fails the verification check, then that data is not re-written into the initial in-situ write location of the failed data in burst zone 356. Instead, that data is re-written into a ZED portion of burst zone 356. Redundant re-writes to ZED areas of a redundant burst zone can also be performed. Re-written data is also verified after writing into the associated ZED portion of a burst zone, and if any further verification fails, then that data is continued to be re-written into the ZED portion. Once all data has been written and successfully verified into a burst zone and ZED portion if needed, then control system 311 can purge the data from cache area 327 to make room for new write operations and further write data. Control system 311 can thus purge portions of the write data from cache area 327 once the portions of the write data are verified in burst zone 356.

Advantageously, in the examples herein, cache area 327 can accumulate write data until a write burst comprising write data spanning multiple tracks is performed to commit cached data into SMR area 328. Data verification is performed after the burst of multiple tracks of data into SMR area 328, which can speed up the commit process by eliminating verification after every track of data and is tailored to the sequential write operation of a particular SMR technique. Once data has been committed into SMR area 328, read operations directed to that data can be serviced from SMR area 328, such as read operations 332. Specifically, if data is committed into burst zone 356, then portions of the data can be provided from either the main portion of burst zone 356 or from ZED portion 357, depending upon where the portions of the data were successfully written and verified then re-written Enhanced operation of data storage device is also achieved by locating the ZED portions proximate to associated burst zones on storage media, to locate re-write data within a physical locality to an associated burst zone on the storage media, reducing long seek delays of read/write heads when reading data from the burst zone and associated ZED portions.

If a ZED portion fills up with re-write data from failed writes to an associated burst zone, then various processes can be established to ensure write data is successfully written into SMR area 328. In a first example, first write data fails verification into burst zone 356 and then enough intervening re-writes are performed to fill up ZED portion 357 without the first write data being successfully re-written into ZED portion 357. This first write data can be held in cache area 327 until a subsequent burst write is performed when more write data is received to initiate a burst write into burst zone 358. This first write data is held in cache area 327 and can then be committed to a different burst zone than initially attempted, namely burst zone 358. Further write data can be accumulated in cache area 327 along with the remaining unverified data from burst zone 356 until a cache commit threshold warrants a second burst transfer of the further write data along with the remaining unverified data into burst zone 356.

In a second example, control system 311 might determine that enough write data has failed verification for a particular burst zone to warrant switching to another burst zone entirely. For example, when a track or tracks experiences a physical defect or multi-block error condition, many data blocks might be attempted to be written to a bad zone on the media. When a threshold amount of data verification failures occur, then control system 311 determines that the set of tracks associated with the current burst zone might be bad and responsively marks that burst zone as unusable for future writes. A different burst zone, such as burst zone 358 might be selected to re-perform the burst commit of the data from cache area 327. In other examples, just the tracks associated with the errors are marked as bad and control system 311 can reduce a size of the associated burst zone.

In further examples, control system 311 might determine that an average or mean number of data verification errors warrants increasing a size of a ZED portion associated with burst zones. The ZED portion can thus be sized responsive to an expected number of re-writes due to data verification errors. As a particular HDD ages, more errors may be encountered over time and control system 311 can increase a ZED size for that HDD to account for the increase in data verification errors. Once the ZED portion increases above a predetermined threshold size, then control system 311 can alert HDD array 310, host system 340, or an operator of the increased average error rate and increased ZED portion sizing. A HDD might be indicated as needing replacement or repair once the ZED portions for each burst zone exceed a particular sizing threshold.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
    storage media comprising a cache storage region and a shingled magnetic recording (SMR) storage region that is divided into a plurality of burst zones;
    a storage control system configured to receive write operations over a host interface for storage of write data by the data storage device and accumulate the write data in the cache storage region until a commit threshold condition;
    responsive to the commit threshold condition, the storage control system configured to burst transfer the write data into at least a first burst zone of the SMR storage region;
    the storage control system configured to verify the write data written into the first burst zone once the storage control system completes the burst transfer of the write data into the first burst zone; and
    responsive to data verify errors in the write data written into the first burst zone, the storage control system configured to write data associated with the data verify errors into an exception location associated with the first burst zone.

2. The data storage device of claim 1, comprising:
    the storage control system configured to purge portions of the write data from the cache storage region once the portions of the write data are verified in the first burst zone.

3. The data storage device of claim 1, comprising:
    the control system configured to identify when a quantity of the data verify errors for the first burst zone exceeds a threshold quantity and responsively identify a second burst zone for the write data;
    the control system configured to burst transfer the write data into at least the second burst zone of the SMR storage region.

4. The data storage device of claim 1, comprising:
    the control system configured to identify when the exception location associated with the first burst zone becomes full before all of the data associated with the data verify errors is committed into the exception location;
    the control system configured to hold remaining data associated with the data verify errors in the cache storage region until at least further write data is accumulated in the cache storage region for a burst transfer of the remaining data and the further write data into a second burst zone.

5. The data storage device of claim 1, comprising:
    the storage control system configured to verify the write data written into the first burst zone by at least initiating a verify process for reading the write data from the first burst zone and performing an error checking process on the write data that is read from the first burst zone.

6. The data storage device of claim 1, wherein the first burst zone comprises a plurality of shingled tracks of the SMR storage region of the storage media, and wherein the exception location associated with the first burst zone comprises a quantity of storage blocks arranged at an end of the first burst zone.

7. The data storage device of claim 1, comprising:
    the storage control system configured to redundantly burst transfer the write data into both the first burst zone of the SMR storage region and a second burst zone of the SMR storage region;
    the storage control system configured to verify the write data written into the first burst zone and the second burst zone once the storage control system completes the burst transfer of the write data into the first burst zone and the second burst zone.

8. A method of operating a data storage device, comprising:
    storing write data responsive to write operations on a storage media comprising a cache storage region and a shingled magnetic recording (SMR) storage region that is divided into a plurality of burst zones;
    accumulating the write data in the cache storage region until a commit threshold condition;
    responsive to the commit threshold condition, burst transferring the write data into at least a first burst zone of the SMR storage region;
    verifying the write data written into the first burst zone once the burst transferring is complete for the write data into the first burst zone; and
    responsive to data verify errors in the write data written into the first burst zone, writing data associated with the data verify errors into an exception location associated with the first burst zone.

9. The method of claim 8, further comprising:
    purging portions of the write data from the cache storage region once the portions of the write data are verified in the first burst zone.

10. The method of claim 8, further comprising:
    identifying when a quantity of the data verify errors for the first burst zone exceeds a threshold quantity and responsively identify a second burst zone for the write data;
    transferring the write data into at least the second burst zone of the SMR storage region.

11. The method of claim 8, further comprising:
    identifying when the exception location associated with the first burst zone becomes full before all of the data associated with the data verify errors is committed into the exception location;
    holding remaining data associated with the data verify errors in the cache storage region until at least further write data is accumulated in the cache storage region for a burst transfer of the remaining data and the further write data into a second burst zone.

12. The method of claim 8, further comprising:
    verifying the write data written into the first burst zone by at least initiating a verify process for reading the write data from the first burst zone and performing an error checking process on the write data that is read from the first burst zone.

13. The method of claim 8, wherein the first burst zone comprises a plurality of shingled tracks of the SMR storage region of the storage media, and wherein the exception location associated with the first burst zone comprises a quantity of storage blocks arranged at an end of the first burst zone.

14. The method of claim 8, further comprising:
redundantly transferring the write data into both the first burst zone of the SMR storage region and a second burst zone of the SMR storage region;
verifying the write data written into the first burst zone and the second burst zone once the storage control system completes the burst transfer of the write data into the first burst zone and the second burst zone.

15. A data storage assembly, comprising:
a plurality of hard disk drives (HDD), each comprising storage media with a cache storage region and a shingled magnetic recording (SMR) storage region that is divided into a plurality of burst zones;
a storage control system configured to receive write operations over a host interface for storage of write data by the data storage assembly and accumulate the write data in a cache storage region of at least a first HDD until a commit threshold condition;
responsive to the commit threshold condition, the storage control system configured to burst transfer the write data into at least a first burst zone of an SMR storage region of at least the first HDD;
the storage control system configured to verify the write data written into the first burst zone once the storage control system completes the burst transfer of the write data into the first burst zone; and
responsive to data verify errors in the write data written into the first burst zone, the storage control system configured to write data associated with the data verify errors into an exception location associated with the first burst zone.

16. The data storage assembly of claim 15, comprising:
the storage control system configured to purge portions of the write data from the cache storage region once the portions of the write data are verified in the first burst zone.

17. The data storage assembly of claim 15, comprising:
the control system configured to identify when a quantity of the data verify errors for the first burst zone exceeds a threshold quantity and responsively identify a second burst zone for the write data;
the control system configured to burst transfer the write data into at least the second burst zone of the SMR storage region.

18. The data storage assembly of claim 15, comprising:
the control system configured to identify when the exception location associated with the first burst zone becomes full before all of the data associated with the data verify errors is committed into the exception location;
the control system configured to hold remaining data associated with the data verify errors in the cache storage region until at least further write data is accumulated in the cache storage region for a burst transfer of the remaining data and the further write data into a second burst zone.

19. The data storage assembly of claim 15, comprising:
the storage control system configured to verify the write data written into the first burst zone by at least instructing the first HDD to verify the write data and perform an error checking process on the write data that was written into the first burst zone.

20. The data storage assembly of claim 15, wherein the first burst zone comprises a plurality of shingled tracks of the SMR storage region of the storage media, and wherein the exception location associated with the first burst zone comprises a quantity of storage blocks arranged at an end of the first burst zone.

* * * * *